April 2, 1957     W. R. LEWIS     2,787,442
TOOL FOR CONTRACTING CULVERT BANDS
Filed Jan. 16, 1956

INVENTOR
WILLIAM R. LEWIS

BY *Ralph Burch*

ATTORNEY

United States Patent Office 2,787,442
Patented Apr. 2, 1957

2,787,442

TOOL FOR CONTRACTING CULVERT BANDS

William R. Lewis, Decatur, Nebr.

Application January 16, 1956, Serial No. 559,216

4 Claims. (Cl. 254—79)

This invention relates to improvements in a tool particularly designed for applying a band that joins the ends of corrugated culvert pipe together.

The sections of corrugated culvert pipe are usually joined together by a band of corrugated metal that bridges the ends of the pipe to be joined, the ends of the band having upstanding flanges to receive bolts for securing the band in clamping engagement with the sections of pipe. It is an object of the present invention to provide a tool having pivoted levers operable to contract the band, the levers being provided with jaws for firmly engaging the flanges of the band and releasably connected therewith so as to prevent slipping or accidental displacement of the jaws while contracting the band.

A further object of the invention resides in providing a tool of the above-mentioned character that is simple in construction, reliable and efficient in operation and inexpensive to manufacture.

Other objects and advantages of the invention will be apparent during the course of the following description.

Figure 1:
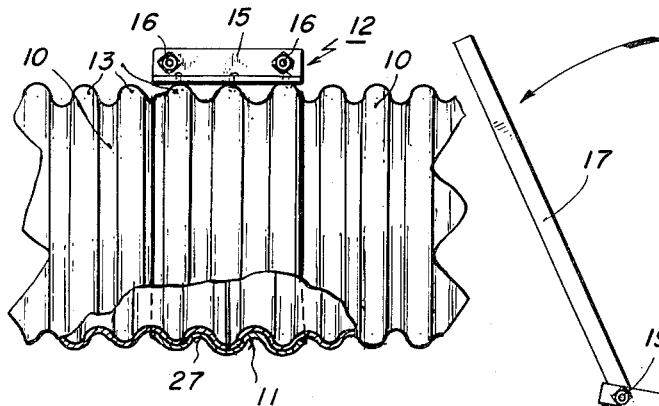
Figure 2:
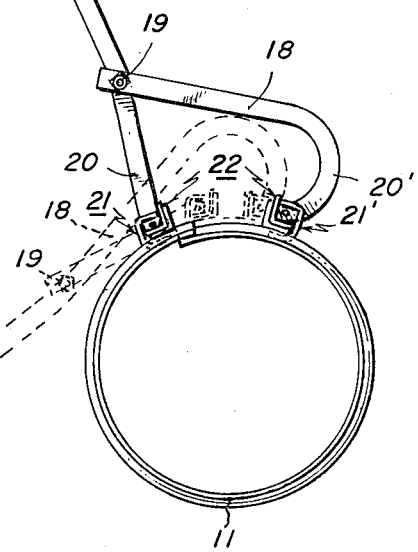
Figure 5:
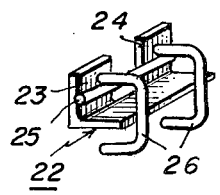
Figure 3:
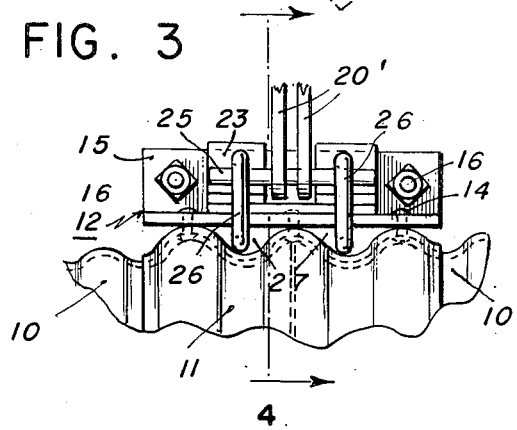
Figure 4:
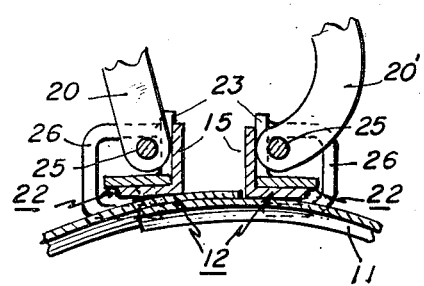

In the accompanying drawing forming a part of this specification and in which like numerals designate like parts throughout the same, Fig. 1 is a side elevational view, partly in section, of a corrugated culvert pipe joint, Fig. 2 is a side elevational view of the tool applied to the band for joining the pipe sections, Fig. 3 is a front elevational view of the jaw in engagement with the flange of the band, Fig. 4 is a detail section taken on line 4—4 of Fig. 3, and, Fig. 5 is a perspective view of the jaw detached from the lever.

Referring to the drawing, the numeral 10 designates a corrugated culvert pipe section and 11 a split band of corrugated metal adapted to encircle the adjoining ends of pipe sections 10 to secure them together. The band 11 adjacent each end has an angle bar 12 secured to the ridges 13 of the corrugations by rivets 14 providing opposed upstanding flanges 15 having openings to receive clamping bolts 16.

The tool for contracting the band 11 comprises a lever 17 having an arm 18 pivotally connected thereto intermediate its ends, as at 19. The portion of the lever above the pivot 19 is bent at a slight angle to the lower portion 20 and the lower portion 20 is disposed opposite the inwardly curved end 20' of the arm 18. Pivotally attached to the end of portion 20 and the curved arm 20' are jaws 21, 21'. Each jaw comprises an angle bar 22 adapted to fit in the angle of the bar 12 carried by the band 11. The upstanding flange 23 of bar 22 is bifurcated intermediate its ends, as at 24, and bridging the bifurcation is a pivot pin 25 which is welded to the inner face of the flange. The end of the lower portion 20 of the lever 17 and the curved end 20' of arm 18 are provided with apertures to receive the pivot pins 25 thus mounting the jaws 21, 21' for pivotal movement. Extending from the inner face of flange 23 on each side of the bifurcation are hooks 26 that extend outwardly, downwardly, and inwardly with their free ends disposed in spaced relation to the bottom face of bars 22. When the jaws 21, 21' are seated in the angle of bars 12, the free ends of hooks 26 enter the valleys 27 of the corrugations beneath the bars 12 thereby releasably holding the jaws in seated engagement with the bars 12 to prevent slipping or accidental displacement of the jaws when operating the tool to contract the split band.

In operation, the split band 11 is positioned around the adjoining ends of the pipe sections 10 to be joined with the corrugations of the band in interfitting engagement with the corrugations of the pipe, as shown in Fig. 1. The ends of the band will be disposed in overlapping relation with angle bars 12 in opposed relation, as shown in Fig. 2. The jaws 21, 21' of lever 17 and arm 18 are seated upon the bars 12 with the hooks 26 engaged beneath the bars 12 to hold the jaws in place. By applying pressure to the upper end of lever 17 in the direction of the arrow shown in Fig. 2, the jaws of the lever and arm will be moved in a direction towards each other thereby contracting the band 11 and moving the bars 12 together. When the lever has been moved to the position shown in dotted lines in Fig. 2, the pivots 19 and 21' will be below pivot 21 thus locking the tool in contracted position. After tightening the band, the bolts 16 are inserted in the openings of the bars 12 to secure the band in clamping engagement with the sections of pipe. By moving the lever in the opposite direction the jaws 21, 21' may be easily removed from engagement with the bars 12.

It is to be understood that the form of the invention herein shown is a preferred example of the same and changes in shape, size and arrangement of the parts may be made without departing from the spirit of the invention or scope of the claims.

Having thus described my invention, I claim:

1. A tool of the character described comprising a lever, an arm pivotally connected to said lever intermediate its ends having its free end opposed to an end of said lever, jaws pivotally connected to the opposed ends of said lever and arm comprising angle bars and hooks extending from one flange of said bars with their free ends extending beneath and in spaced relation to the other flange.

2. A tool for contracting culvert bands having upstanding flanges attached to the end portions comprising a lever, an arm pivotally connected to said lever intermediate its ends, jaws attached to the opposed ends of said lever and arm adapted to engage the flanges of the culvert band, and hooks carried by said jaws for engagement beneath the flanges of the band to releasably hold the jaws in position.

3. A tool for contracting culvert bands having upstanding flanges attached to the end portions, comprising a lever, an arm pivotally attached to said lever intermediate its ends, jaws pivotally attached to the ends of said lever and arm in opposed relation adapted to engage the flanges of the culvert band and hooks extending from said jaws for releasable engagement beneath the flanges of the culvert band to hold the jaws in operative position.

4. A tool for contracting culvert bands having angle bars attached to the end portions comprising a lever, an arm pivotally attached to said lever intermediate its ends, angle bars pivotally connected to the opposed ends of said lever and arm adapted to seat in the angle bars of the culvert band, and hooks attached to the angle bars of said lever and arm adapted to engage beneath the angle bars of the culvert band.

References Cited in the file of this patent

UNITED STATES PATENTS 569,056    Regan  ----------------  Oct. 6, 1896